US012643592B2

(12) United States Patent (10) Patent No.: US 12,643,592 B2

Zhu et al. (45) Date of Patent: Jun. 2, 2026

(54) STEERING COLUMN CONNECTION MECHANISM AND VEHICLE

(71) Applicants:ZHEJIANG ZEEKR INTELLIGENT TECHNOLOGY CO., LTD., Ningbo (CN); ZHEJIANG GEELY HOLDING GROUP CO., LTD., Hangzhou (CN)

(72) Inventors: Xiaojun Zhu, Ningbo (CN); Fuhai Li, Ningbo (CN)

(73) Assignees: ZHEJIANG ZEEKR INTELLIGENT TECHNOLOGY CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 0 days.

(21) Appl. No.: 19/084,793

(22) Filed: Mar. 20, 2025

(65) Prior Publication Data

US 2025/0214642 A1      Jul. 3, 2025

Related U.S. Application Data

(63) Continuation of application No. PCT/CN2023/110291, filed on Jul. 31, 2023.

(30) Foreign Application Priority Data

Nov. 10, 2022      (CN) .......................... 202211414995.7

(51) Int. Cl.
    *B62D 1/185* (2006.01)
    *B62D 1/181* (2006.01)
(52) U.S. Cl.
    CPC ............. *B62D 1/185* (2013.01); *B62D 1/181* (2013.01)

(58) Field of Classification Search
    CPC ..... B62D 1/181; B62D 1/185; F16C 2326/24; F16C 29/001; F16C 29/02; F16C 29/10; F16C 29/123
    See application file for complete search history.

(56) References Cited

U.S. PATENT DOCUMENTS 3,762,783 A * 10/1973 Hay ........................ F16C 19/54
                                                          384/558
4,317,387 A * 3/1982 Myers ..................... F16B 7/105
                                                          403/328

(Continued)

FOREIGN PATENT DOCUMENTS

CN          203558119 U      4/2014
CN          207565673 U      7/2018

(Continued)

OTHER PUBLICATIONS

International Search Report dated Nov. 9, 2023 in International Application No. PCT/CN2023/110291. English translation attached.

(Continued)

*Primary Examiner* — Laura Freedman

(57) ABSTRACT

Provided are a steering column connection mechanism and a vehicle. The steering column connection mechanism is applied in the vehicle. The steering column connection mechanism includes a sliding guide rail mechanism and a pre-tightening adjustment mechanism. The sliding guide rail mechanism is configured to connect a steering column with a vehicle frame of the vehicle, enabling the steering column to move relative to the vehicle frame for a telescopic adjustment. The pre-tightening adjustment mechanism includes a nut, a guide rod, and a spring. The spring is sleeved over the guide rod and abuts against the sliding guide rail mechanism and the guide rod on two sides of the spring respectively. The nut and the guide rod are connected to the vehicle frame. The nut is capable of driving the guide (Continued)

rod to move relative to the vehicle frame to adjust a pressure exerted by the spring on the sliding guide rail mechanism.

18 Claims, 4 Drawing Sheets

(56)          References Cited

U.S. PATENT DOCUMENTS

| | | | | |
|---|---|---|---|---|
| 7,658,125 | B2 * | 2/2010 | Inayoshi | B62D 7/224 |
| | | | | 280/775 |
| 8,215,460 | B2 * | 7/2012 | Li | F16D 65/60 |
| | | | | 188/79.55 |
| 8,646,351 | B2 * | 2/2014 | Fuechsel | F16H 55/24 |
| | | | | 74/425 |
| 9,022,426 | B2 * | 5/2015 | Sakata | B62D 1/184 |
| | | | | 74/495 |
| 9,376,137 | B2 * | 6/2016 | Yoshihara | B62D 1/195 |
| 9,649,932 | B2 * | 5/2017 | Vermeersch | B62D 1/185 |
| 9,744,983 | B2 * | 8/2017 | Stinebring | B62D 1/185 |
| 9,919,725 | B2 * | 3/2018 | Hong | B62D 1/189 |
| 10,065,671 | B2 * | 9/2018 | Sugishita | B62D 1/185 |
| 10,160,474 | B2 * | 12/2018 | Kim | B62D 1/195 |
| 10,196,080 | B2 * | 2/2019 | Kim | B62D 1/195 |
| 10,421,476 | B2 * | 9/2019 | Rouleau | B62D 1/184 |
| 11,414,121 | B2 * | 8/2022 | Rist | B62D 1/184 |
| 11,518,226 | B2 * | 12/2022 | Bengtsson | B60L 53/80 |
| 2009/0120229 | A1 | 5/2009 | Shibazaki et al. | |
| 2011/0227323 | A1 | 9/2011 | Osuka et al. | |
| 2015/0000457 | A1 | 1/2015 | Born et al. | |
| 2025/0196908 | A1 * | 6/2025 | Li | B62D 1/183 |
| 2025/0214643 | A1 * | 7/2025 | Li | B62D 1/197 |

FOREIGN PATENT DOCUMENTS

| | | | | |
|---|---|---|---|---|
| CN | 208102097 | U | 11/2018 | |
| CN | 208116860 | U | 11/2018 | |
| CN | 213023753 | U | 4/2021 | |
| CN | 115571215 | A | 1/2023 | |
| CN | 222933947 | U * | 6/2025 | |
| DE | 102005006057 | A1 | 8/2006 | |
| EP | 2783941 | A1 | 10/2014 | |
| GB | 2326849 | A * | 1/1999 | B62D 1/195 |
| JP | 2004353785 | A * | 12/2004 | |
| JP | 2009107540 | A | 5/2009 | |
| WO | 2021180609 | A1 | 9/2021 | |

OTHER PUBLICATIONS

First Office Action dated Apr. 25, 2025 received in corresponding patent family application No. CN202211414995.7. English translation attached.

Grant Notice dated Nov. 10, 2025 received in corresponding patent family application No. CN202211414995.7. English translation attached.

Extended European Search Report dated Oct. 10, 2025 received in corresponding European Application No. EP23887538.9.

\* cited by examiner

STEERING COLUMN CONNECTION MECHANISM AND VEHICLE

ROSS-REFERENCE TO RELATED APPLICATIONS

This application is a continuation of International Application No. PCT/CN2023/110291, filed on Jul. 31, 2023, which claims priority to and benefits of Chinese patent application No. 202211414995.7, filed with China National Intellectual Property Administration on Nov. 10, 2022, the entire contents of which are incorporated herein by reference.

FIELD

The present disclosure relates to the field of vehicle technologies, and more particularly, to a steering column connection mechanism and a vehicle.

BACKGROUND

In the related art, during an adjustment of a steering column of a vehicle, sliding friction is generated between the steering column and a support. A friction force of the sliding friction is large and increases with deterioration and consumption of lubricating grease, generating noise and affecting feel during the adjustment. In addition, a driving capability of a motor would be affected.

SUMMARY

Embodiments of the present disclosure provide a steering column connection mechanism and a vehicle.

A steering column connection mechanism according to embodiments of the present disclosure is applied in a vehicle. The steering column connection mechanism includes: a sliding guide rail mechanism configured to connect a steering column with a vehicle frame of the vehicle, enabling the steering column to move relative to the vehicle frame for a telescopic adjustment; and a pre-tightening adjustment mechanism including a nut, a guide rod, and a spring. The spring is sleeved over the guide rod, and abuts against the sliding guide rail mechanism and the guide rod on two sides of the spring respectively. The nut and the guide rod are connected to the vehicle frame, and the nut is capable of driving the guide rod to move relative to the vehicle frame to adjust a pressure exerted by the spring on the sliding guide rail mechanism.

In the steering column connection mechanism according to the embodiments of the present disclosure, the steering column and the vehicle frame can be connected to each other by the sliding guide rail mechanism to ensure that the steering column can move smoothly relative to the vehicle frame. Also, the nut can be adjusted to change a pre-tightening force on the sliding guide rail mechanism, which in turn reduces a friction force, improving an efficiency of an adjustment of a motor and reducing energy consumption of the motor. In addition, through an adjustment of the nut, overall rigidity of the steering column can be adjusted to a predetermined extent. If high rigidity of the steering column is required, a clamping force between the vehicle frame and the steering column can be increased. If the overall rigidity of the steering column needs to be reduced, the clamping force between the vehicle frame and the steering column can be appropriately reduced.

In some embodiments, the sliding guide rail mechanism includes a linear needle roller bearing, a guide rail, and a pressing block. The linear needle roller bearing is connected to the steering column. The pressing block is connected to the vehicle frame. The pressing block abuts against the guide rail and presses the guide rail tightly against the linear needle roller bearing. The guide rod at least partially extends into the pressing block. The spring abuts against the pressing block at an end of the spring.

In some embodiments, each of the linear needle roller bearing and the guide rail is in a V shape. The linear needle roller bearing and the guide rail match with each other and are attached to each other. The pressing block includes an arrow-shaped portion. The arrow-shaped portion extends into a V-shaped opening of the guide rail to press the guide rail tightly against the linear needle roller bearing.

In some embodiments, the steering column connection mechanism further includes an adjustment bottom plate fixedly connected to the steering column. The adjustment bottom plate has a V-shaped connection portion configured to receive and be connected to the linear needle roller bearing.

In some embodiments, the pressing block has a trapezoidal guide hole at a side of the pressing block away from the guide rail. Both the guide rod and the spring at least partially extend into the trapezoidal guide hole.

In some embodiments, an angle of each of a V-shaped opening of the linear needle roller bearing and the V-shaped opening of the guide rail is smaller than 90°.

In some embodiments, the steering column connection mechanism further includes a support and a mounting bottom plate. The pre-tightening adjustment mechanism is disposed at the support. The mounting bottom plate is connected to the vehicle frame. The support is fixedly connected to the mounting bottom plate.

In some embodiments, the support has a threaded hole. The nut and the threaded hole are connected to each other through a thread. The nut is rotatable relative to the support to drive the guide rod to move relative to the support, adjusting the pressure exerted by the spring on the sliding guide rail mechanism.

In some embodiments, the support has a recess. The sliding guide rail mechanism includes a pressing block. The pressing block has a connection portion at an end of the pressing block close to the support. The connection portion is received in the recess.

A vehicle according to embodiments of the present disclosure includes a vehicle body and the steering column connection mechanism according to any one of the above-described embodiments. The steering column connection mechanism is disposed at the vehicle body.

In the steering column connection mechanism and the vehicle according to the embodiments of the present disclosure, the steering column and the vehicle frame can be connected to each other by the sliding guide rail mechanism to ensure that the steering column can move smoothly relative to the vehicle frame. Also, the nut can be adjusted to change the pre-tightening force on the sliding guide rail mechanism, which in turn reduces the friction force, improving the efficiency of the adjustment of the motor and reducing the energy consumption of the motor. In addition, through the adjustment of the nut, the overall rigidity of the steering column can be adjusted to the predetermined extent. If high rigidity of the steering column is required, the clamping force between the vehicle frame and the steering column can be increased. If the overall rigidity of the steering column needs to be reduced, the clamping force between the vehicle frame and the steering column can be appropriately reduced.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings.

Figure 1:
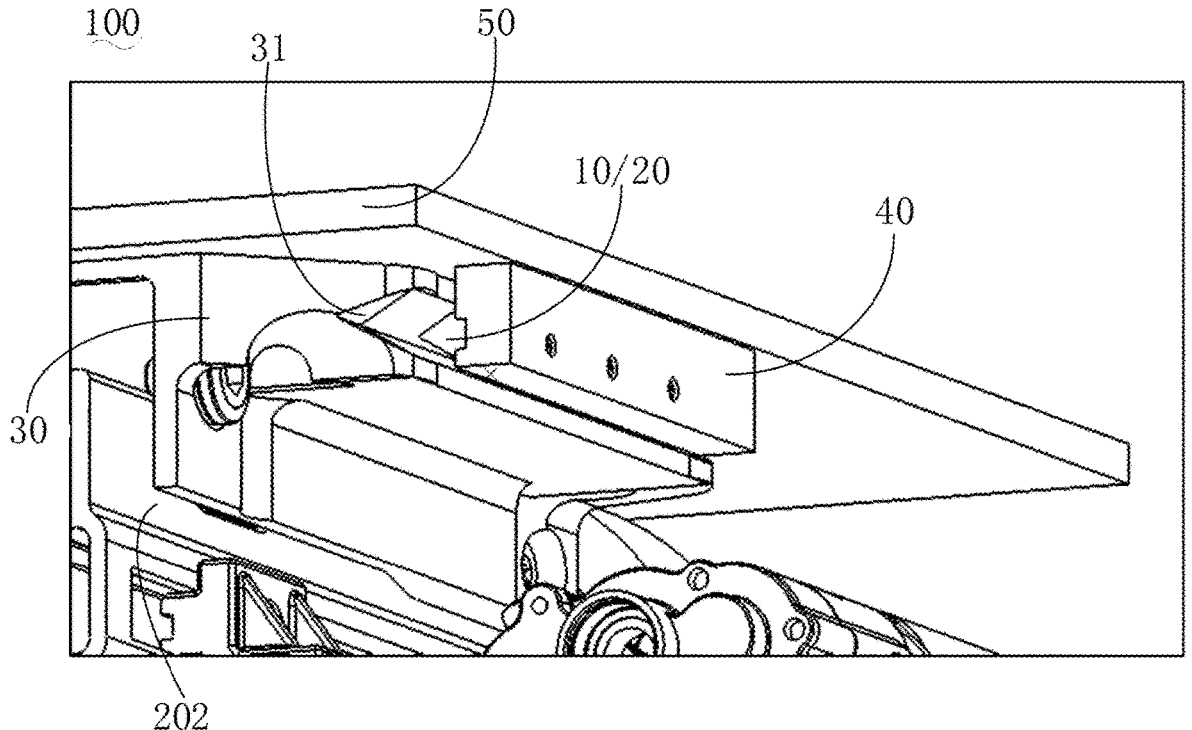
FIG. 1 is a schematic structural view of a steering column connection mechanism according to an embodiment of the present disclosure.

Description of Reference Numerals of Main Components:

steering column connection mechanism 100, sliding guide rail mechanism 10, linear needle roller bearing 11, guide rail 12, pressing block 13, arrow-shaped portion 131, trapezoidal guide hole 132, connection portion 133, pre-tightening adjustment mechanism 20, nut 21, guide rod 22, spring 23, adjustment bottom plate 30, V-shaped connection portion 31, support 40, threaded hole 41, recess 42, mounting bottom plate 50, vehicle 200, vehicle body 201, steering column 202, vehicle frame 203.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limit, the present disclosure.

In the present disclosure, unless expressly stipulated and defined otherwise, the first feature "on" or "under" the second feature may mean that the first feature is in direct contact with the second feature, or the first and second features are in indirect contact through another feature between them. Moreover, the first feature "above" the second feature means that the first feature is directly above or obliquely above the second feature, or simply means that the level of the first feature is higher than that of the second feature. The first feature "below" the second feature means that the first feature is directly below or obliquely below the second feature, or simply means that the level of the first feature is smaller than that of the second feature.

A number of embodiments or examples are provided in the disclosure of the present disclosure to implement different structures of the present disclosure. To simplify the disclosure of the present disclosure, components and arrangements of particular examples will be described below, which are, of course, examples only and are not intended to limit the present disclosure. Further, reference numerals and/or reference letters may be repeated in different examples of the present disclosure. Such repetition is for the purpose of simplicity and clarity and does not indicate any relationship between various embodiments and/or arrangements in question. In addition, various examples of specific processes and materials are provided in the present disclosure. However, those of ordinary skill in the art may be in aware of applications of other processes and/or the use of other materials.

As illustrated in FIG. 1 to FIG. 4, a steering column connection mechanism 100 according to embodiments of the present disclosure is applied in a vehicle 200. The steering column connection mechanism 100 includes a sliding guide rail mechanism 10 and a pre-tightening adjustment mechanism 20. The sliding guide rail mechanism 10 is configured to connect a steering column 202 with a vehicle frame 203 of the vehicle 200, enabling the steering column 202 to move relative to the vehicle frame 203 for a telescopic adjustment. The pre-tightening adjustment mechanism 20 includes a nut 21, a guide rod 22, and a spring 23. The spring 23 is sleeved over the guide rod 22 and abuts against the sliding guide rail mechanism 10 and the guide rod 22 on two sides of the spring 23 respectively. The nut 21 and the guide rod 22 are connected to the vehicle frame 203. The nut 21 is capable of driving the guide rod 22 to move relative to the vehicle frame 203 to adjust a pressure exerted by the spring 23 on the sliding guide rail mechanism 10.

In the steering column connection mechanism 100 according to the embodiments of the present disclosure, the steering column 202 and the vehicle frame 203 can be connected to each other by the sliding guide rail mechanism 10 to ensure that the steering column 202 can move smoothly relative to the vehicle frame 203. Also, the nut 21 can be adjusted to change a pre-tightening force on the sliding guide rail mechanism 10, which in turn reduces a friction force, improving an efficiency of an adjustment of a motor and reducing energy consumption of the motor. In addition, through an adjustment of the nut 21, overall rigidity of the steering column 202 can be adjusted to a predetermined extent. If high rigidity of the steering column 202 is required, a clamping force between the vehicle frame 203 and the steering column 202 can be increased. If the overall rigidity of the steering column 202 needs to be reduced, the clamping force between the vehicle frame 203 and the steering column 202 can be appropriately reduced.

In the related art, during a telescopic adjustment of the steering column, friction between the steering column and a support is sliding friction. With gradual deterioration and consumption of a lubricant, a friction force of a relative movement between the steering column and the support increases, which deteriorates feel of an operation, and generates noise during the telescopic adjustment. In addition, the steering column is prone to a relative rotation or a misalignment during a movement.

In the embodiments of the present disclosure, the steering column connection mechanism 100 may adjust a distance between the vehicle frame 203 and the steering column 202 by the pre-tightening adjustment mechanism 20 to avoid a large gap between the vehicle frame 203 and the steering column 202. In addition, the nut 21 can be adjusted to change the pre-tightening force on the sliding guide rail mechanism 10, which in turn reduces the friction force between the steering column 202 and the vehicle frame 203, i.e., the pressure on the sliding guide rail mechanism 10, to avoid noise while preventing the feel of the operation from being deteriorated. In addition, when the movement of the steering column 202 relative to the vehicle frame 203 is controlled by the motor, reduction in the friction force can improve the efficiency of the adjustment of the motor and reduce the energy consumption of the motor.

In addition, the steering column connection mechanism 100 may limit a relative movement between the steering column 202 and the vehicle frame 203 through the sliding guide rail mechanism 10 to provide a position limitation and guidance, which avoids problems of misalignment or rotation of the steering column 202 relative to the vehicle frame 203 during the movement of the steering column 202. In other embodiments of the present disclosure, the spring 23 may also be replaced by other elastic members to achieve the same function, which is not specifically limited here.

Figure 3:
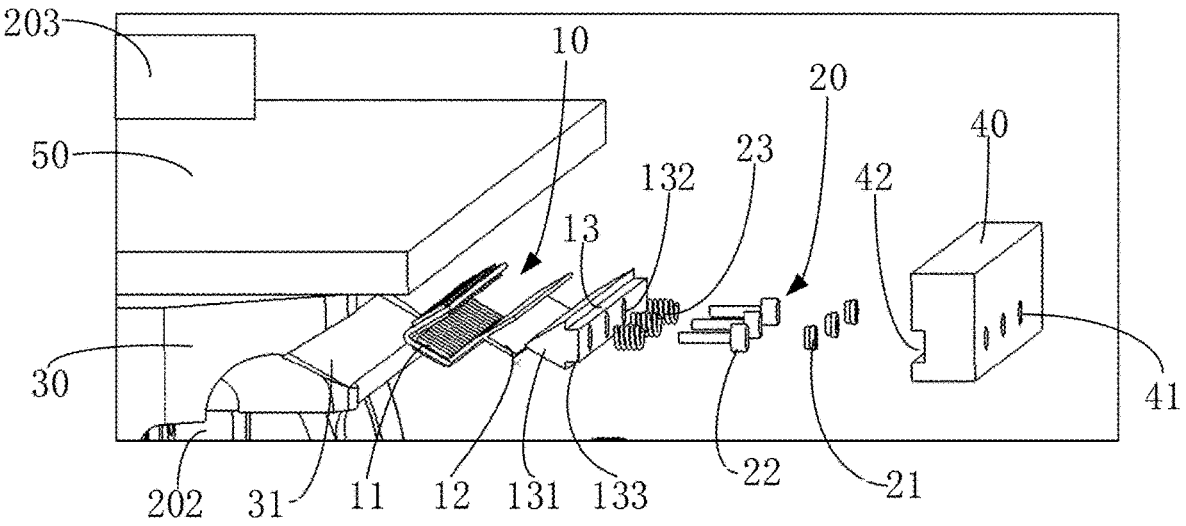
FIG. 3 is a schematic exploded view of a steering column connection mechanism according to an embodiment of the present disclosure.
Figure 5:
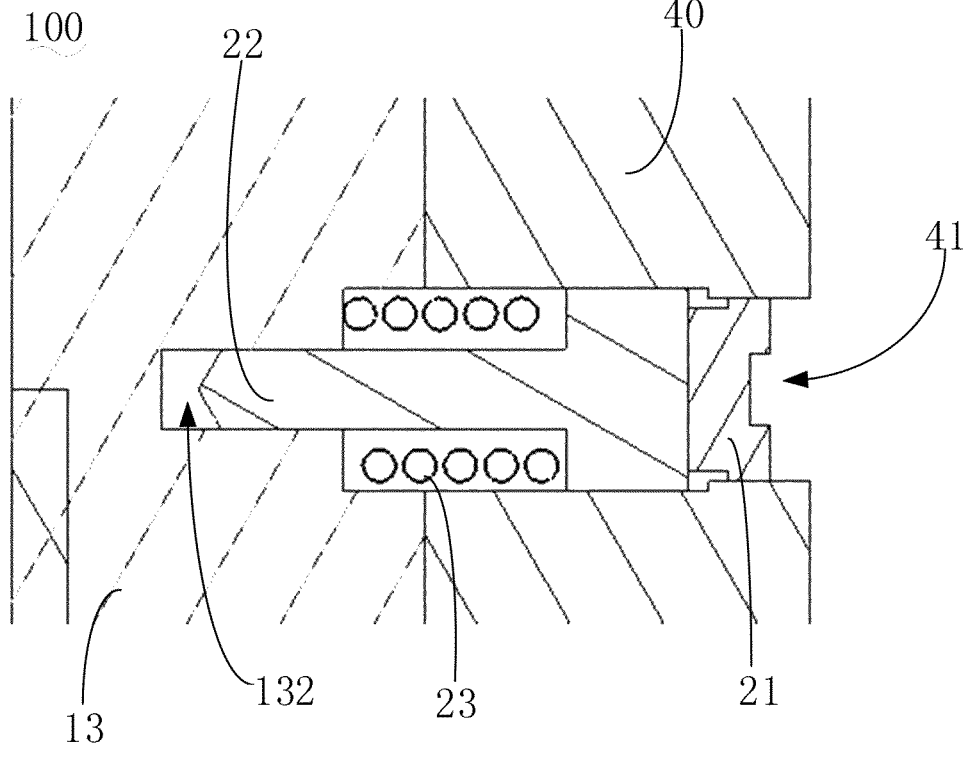
FIG. 5 is a schematic cross-sectional view of a steering column connection mechanism according to an embodiment of the present disclosure.

As illustrated in FIG. 3 and FIG. 5, in some embodiments, the sliding guide rail mechanism 10 includes a linear needle roller bearing 11, a guide rail 12, and a pressing block 13. The linear needle roller bearing 11 is connected to the steering column 202. The pressing block 13 is connected to the vehicle frame 203. The pressing block 13 abuts against the guide rail 12 and presses the guide rail 12 tightly against the linear needle roller bearing 11. The guide rod 22 at least partially extends into the pressing block 13. The spring 23 abuts against the pressing block 13 at an end of the spring 23.

In this way, the pressing block 13 can press the guide rail 12 tightly against the linear needle roller bearing 11, and the guide rail 12 can move relative to the linear needle roller bearing 11, which causes a needle roller to rotate, generating rolling friction. A friction force of the rolling friction is small, which can effectively reduce a loss of lubricating grease to avoid a problem of noise. In addition, the nut 21 may be disposed in the pressing block 13, and may rotate relative to the pressing block 13 to advance or retreat in a manner of abutting against the guide rod 22, in such a manner that a compression amount of the spring 23 is controlled, which realizes the adjustment of the pre-tightening force between the vehicle frame 203 and the steering column 202.

In an exemplary embodiment of the present disclosure, the linear needle roller bearing 11 may be connected to the steering column 202, the pressing block 13 may be connected to the vehicle frame 203, and the pressing block 13 may be directly connected to the guide rail 12 at another side of the pressing block 13, ensuring that the guide rail 12 can be pressed against the linear needle roller bearing 11. In this case, the needle roller on the linear needle roller bearing 11 is in direct contact with the guide rail 12. When the vehicle frame 203 and the guide rail 12 move relative to the steering column 202, the needle roller can roll, in such a manner that the rolling friction is generated between the needle roller and the guide rail 12. In addition, the spring 23 can prevent the guide rod 22 from being in direct contact with the pressing block 13, which avoids a rigid collision damage.

Figure 2:
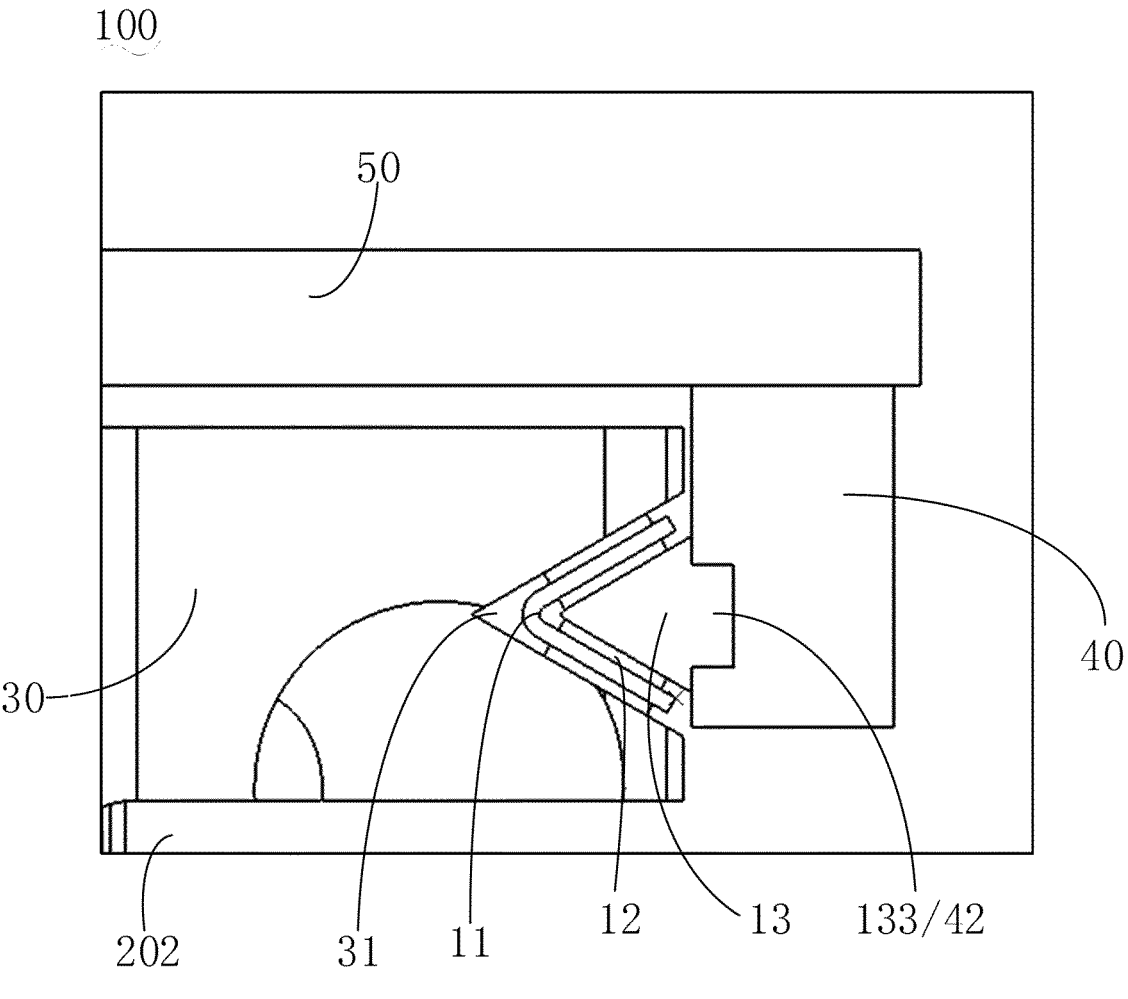
FIG. 2 is another schematic structural view of a steering column connection mechanism according to an embodiment of the present disclosure.

As illustrated in FIG. 2 and FIG. 3, in some embodiments, each of the linear needle roller bearing 11 and the guide rail 12 is in a V shape. The linear needle roller bearing 11 and the guide rail 12 match with each other and are attached to each other. The pressing block 13 includes an arrow-shaped portion 131. The arrow-shaped portion 131 extends into a V-shaped opening of the guide rail 12 to press the guide rail 12 tightly against the linear needle roller bearing 11.

In this way, both the linear needle roller bearing 11 and the guide rail 12 are in the V shape, ensuring that the linear needle roller bearing 11 can be tightly attached to the guide rail 12. In addition, when the pressing block 13 applies a pressure to the guide rail 12 in a direction pointed by the arrow-shaped portion 131, the pressure can be converted into component forces on two surfaces, which avoids a problem of offset and misalignment of the guide rail 12 relative to the linear needle roller bearing 11 caused by an action of the pressing block 13.

Further, as illustrated in FIG. 2 and FIG. 3, in some embodiments, the steering column connection mechanism 100 further includes an adjustment bottom plate 30 fixedly connected to the steering column 202. The adjustment bottom plate 30 has a V-shaped connection portion 31. The V-shaped connection portion 31 is configured to receive and be connected to the linear needle roller bearing 11.

In this way, since the V-shaped connection portion 31 can receive and be connected to the linear needle roller bearing 11, the linear needle roller bearing 11 is prevented from being misaligned with the adjustment bottom plate 30 under pressures from the pressing block 13 and the guide rail 12.

In an exemplary embodiment of the present disclosure, the adjustment bottom plate 30 may be fixedly connected to the steering column 202, and the V-shaped connection portion 31 may be connected to the linear needle roller bearing 11 of the V shape. In this way, the linear needle roller bearing 11 may maintain a fixed position relative to the adjustment bottom plate 30. In this case, the arrow-shaped portion 131 and a V-shaped protrusion of the guide rail 12 may extend into a V-shaped opening of the linear needle roller bearing 11 and abut against the needle roller. In this way, when a force is applied to an upper part or a lower part of the pressing block 13, the misalignment of the guide rail 12 relative to the linear needle roller bearing 11 can be avoided.

As illustrated in FIG. 3 and FIG. 5, in some embodiments, the pressing block 13 has a trapezoidal guide hole 132 at a side of the pressing block 13 away from the guide rail 12. Both the guide rod 22 and the spring 23 at least partially extend into the trapezoidal guide hole 132.

In this way, the guide rod 22 can extend into a middle trapezoidal guide hole of trapezoidal guide holes 132, and the spring 23 can abut against a trapezoidal surface of the trapezoidal guide hole 132, which ensures limited positions of the guide rod 22 and the spring 23.

In an exemplary embodiment of the present disclosure, the pressing block 13 has a trapezoidal guide hole 132 at the side of the pressing block 13 away from the guide rail 12. Both the guide rod 22 and the spring 23 at least partially extend into the trapezoidal guide hole 132. In this way, the nut 21 can abut against the guide rod 22 and move by adjusting the nut 21, and the guide rod 22 in turn is pressed against the spring 23, and thus a compression amount of the spring 23 can be controlled. Exemplarily, in an example, when the nut 21 moves towards the adjustment bottom plate 30, the guide rod 22 is pressed against the spring 23 to press the spring 23 tightly. The spring 23 may abut against the trapezoidal surface of the trapezoidal guide hole 132 to be pressed against the pressing block 13, in such a manner that the pressures exerted by the pressing block 13 and the guide rail 12 on the linear needle bearing 11 are increased. Therefore, the clamping force between the vehicle frame 203 and the steering column 202 can be increased, and accordingly the steering column 202 has high rigidity. In another example, when the nut 21 moves away from the adjustment bottom plate 30, the spring 23 is relaxed, in such a manner that the pressure exerted by the pressing block 13 and the guide rail 12 on the linear needle roller bearing 11 is reduced. Therefore, the clamping force between the vehicle frame 203 and the steering column 202 can be reduced, and accordingly the steering column 202 has low rigidity.

Further, when the friction force needs to be adjusted, a friction force in a direct adjustment can be increased or decreased through an axial adjustment of the nut 21 of the pre-tightening adjustment mechanism. Since increasing or decreasing a pressing force also affects the overall rigidity of the entire mechanism, natural frequencies of the entire steering column 202 and the vehicle frame 203 can be adjusted by adjusting the pressing force to adapt to a corresponding system.

As illustrated in FIG. 2 and FIG. 3, in some embodiments, an angle of each of a V-shaped opening of the linear needle roller bearing 11 and the V-shaped opening of the guide rail 12 is smaller than 90°. In this way, the angle of the V-shaped opening is avoided to be too large, which solves a problem that an element of the sliding guide rail mechanism 10 slides out of the V-shaped opening.

In an exemplary embodiment of the present disclosure, by replacing a conventional sliding guide groove with the linear needle roller bearing 11 of the V shape and the guide rail 12 of the V shape, a sliding friction force is reduced and converted into a rolling friction force, and a structure is simplified. In addition, by adjusting the nut 21 and the spring 23, the clamping force between the vehicle frame 203 and the steering column 202 may be adjusted to adjust the overall rigidity of the steering column 202. In this way, the natural frequencies of the steering column 202 and the vehicle frame 203 are appropriate, which avoids a problem of resonance damages to elements. The angle of each V-shaped opening being smaller than 90° limits positions of the linear needle roller bearing 11, the guide rail 12, and the pressing block 13. The V-shaped guide rail 12 limits a relevant degree of freedom of the steering column 202, and thus the steering column 202 can only move linearly with the adjustment bottom plate 30, which avoids rotation or offset of the steering column 202 when the steering column 202 is in its operation.

As illustrated in FIG. 1 and FIG. 3, in some embodiments, the steering column connection mechanism 100 further includes a support 40 and a mounting bottom plate 50. The mounting bottom plate 50 is connected to the vehicle frame 203. The support 40 is fixedly connected to the mounting bottom plate 50. The pre-tightening adjustment mechanism 20 is disposed at the support 40.

In this way, the support 40 faces towards the adjustment bottom plate 30, which enables the guide rod 22 and the spring 23 to partially extend into the pressing block 13 when the pre-tightening adjustment mechanism 20 is disposed at the support 40. In this way, the steering column 202 can be connected to the mounting bottom plate 50 by the steering column connection mechanism 100 according to the embodiments of the present disclosure. The steering column 202 may be disposed at an end of the steering column connection mechanism 100 away from the mounting bottom plate 50. In this way, the steering column 202 can be connected to the vehicle frame 203 to ensure connection stability.

Further, as illustrated in FIG. 3 and FIG. 5, in some embodiments, the support 40 has a threaded hole 41. The nut 21 and the threaded hole 41 are connected to each other through a thread. The nut 21 is rotatable relative to the support 40 to drive the guide rod 22 to move relative to the support 40, adjusting the pressure exerted by the spring 23 on the sliding guide rail mechanism 10.

In this way, the nut 21 is connected to and engaged into the threaded hole 41 through the thread, in such a manner that a user can quantitatively adjust a distance by which the nut 21 is screwed into the pressing block 13 in a manner of abutting against the guide rod 2. Therefore, the compression amount of the spring 23 can be changed to adjust the pressures exerted by the pressing block 13 on the guide rail 12 and the linear needle roller bearing 11.

Further, as illustrated in FIG. 2 and FIG. 3, in some embodiments, the support 40 has a recess 42. The sliding guide rail mechanism 10 includes the pressing block 13. The pressing block 13 has a connection portion 133 at an end of the pressing block 13 close to the support 40. The connection portion 133 is received in the recess 42.

In this way, the connection portion 133 of the pressing block 13 is received in the recess 42, which limits a position of the pressing block 13 to avoid a problem that the pressing block 13 comes out of the recess 42 and is displaced.

In an exemplary embodiment of the present disclosure, the trapezoidal guide hole 133 may be formed on the connection portion 133. The nut 21 is disposed at the support 40. The connection portion 133 of the pressing block 13 may be received in the recess 42. In this way, the spring 23 and the guide rod 22 can partially extend into the trapezoidal guide hole 132. A degree of freedom of a movement of the pressing block 13 is limited by the guide rod 22, in such a manner that the pressing block 13 can only move along an axis of the guide rod 22 to implement a pressing operation or a relaxing operation. The spring 23 is mounted in a counter-bore hole of the pressing block 13 of the V shape and the support 40. The adjustment nut 21 and the support 40 are connected through a thread. The nut 21 is rotated to be adjusted. An axial movement of the nut 21 is adjusted to allow the guide rod 22 to compress the spring 23 to increase the pressing force.

In the embodiments of the present disclosure, an adjustment of the steering column 202 may be controlled by the motor. By disposing the linear needle roller bearing 11 of the V shape between the support 40 and the steering column 202, a conventional sliding friction force is converted into a rolling friction force of a bearing when the telescopic adjustment is carried out between the steering column 202 and the support 40, which reduces the friction force, improving the efficiency during the adjustment of the motor and reducing the energy consumption of the motor. Further, a probability of generating abnormal noise during sliding is reduced. In addition, the friction force of the rolling bearing can be adjusted as desired through adjusting the nut 21 and the compression amount of the spring 23, which maintains a constant friction force on an entire platform. In this way, a selection requirement of the motor is reduced, which lowers development costs, and improves versatility and performance of the steering column 202. Therefore, by adjusting the nut 21, the overall rigidity of the steering column 202 can be adjusted to a predetermined extent. If the high rigidity of the steering column 202 is required, the clamping force between the support 40 and the steering column 202 can be increased. If the overall rigidity of the steering column 202 needs to be reduced, the clamping force between the support 40 and the steering column 202 can be appropriately reduced.

Figure 4:
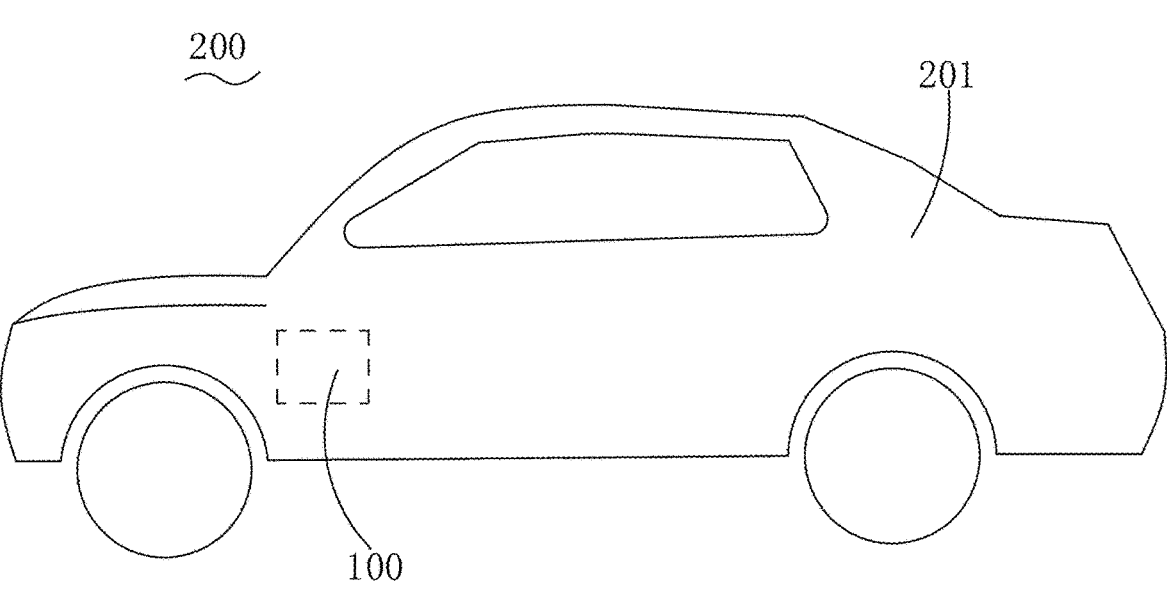
FIG. 4 is a schematic structural view of a vehicle according to an embodiment of the present disclosure.

As illustrated in FIG. 4, a vehicle 200 according to embodiments of the present disclosure includes a vehicle body 201 and the steering column connection mechanism 100 according to any one of the above embodiments. The steering column connection mechanism 100 is disposed at the vehicle body 201.

In the steering column connection mechanism 100 and the vehicle 200 according to the embodiments of the present disclosure, the steering column 202 and the vehicle frame 203 can be connected to each other by the sliding guide rail mechanism 10 to ensure that the steering column 202 can move smoothly relative to the vehicle frame 203. Also, the nut 21 can be adjusted to change the pre-tightening force on the sliding guide rail mechanism 10, which in turn reduces the friction force, improving the efficiency of the adjustment of the motor and reducing the energy consumption of the motor. In addition, through the adjustment of the nut 21, the overall rigidity of the steering column 202 can be adjusted to the predetermined extent. If the high rigidity of the steering column 202 is required, the clamping force between the vehicle frame 203 and the steering column 202 can be increased. If the overall rigidity of the steering column 202 needs to be reduced, the clamping force between the vehicle frame 203 and the steering column 202 can be appropriately reduced.

In the embodiments of the present disclosure, a specific type of the vehicle 200 is not limited. The vehicle 200 may be an electric vehicle or a hybrid electric vehicle, to meet various needs.

In the description of the embodiments of the present disclosure, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the embodiments of the present disclosure, unless otherwise defined, "plurality" means at least two.

In the description of the present disclosure, reference throughout this specification to "an embodiment." "some embodiments," "schematic embodiment," "example," "a specific example," or "some examples" means that a particular feature, structure, material, or characteristic described in connection with the embodiment or example is included in at least one embodiment or example of the present disclosure. The appearances of the above phrases in various places throughout this specification are not necessarily referring to the same embodiment or example. Further, the particular features, structures, materials, or characteristics may be combined in any suitable manner in one or more embodiments or examples.

Although embodiments of the present disclosure have been shown and described above, it should be understood that above embodiments are merely exemplary, and cannot be construed to limit the present disclosure. For those of ordinary skill in the art, changes, alternatives, and modifications can be made to the embodiments without departing from the scope of the present disclosure.

What is claimed is:

1. A steering column connection mechanism, applied in a vehicle, the steering column connection mechanism comprising:

a sliding guide rail mechanism configured to connect a steering column with a vehicle frame of the vehicle, enabling the steering column to move relative to the vehicle frame for a telescopic adjustment; and a pre-tightening adjustment mechanism comprising a nut, a guide rod, and a spring, the spring being sleeved over the guide rod and abutting against the sliding guide rail mechanism and the guide rod on two sides of the spring respectively, the nut and the guide rod being connected to the vehicle frame, and the nut being capable of driving the guide rod to move relative to the vehicle frame to adjust a pressure exerted by the spring on the sliding guide rail mechanism.

2. The steering column connection mechanism according to claim 1, wherein the sliding guide rail mechanism comprises:

a linear needle roller bearing connected to the steering column;

a guide rail; and a pressing block connected to the vehicle frame, the pressing block abutting against the guide rail and pressing the guide rail tightly against the linear needle roller bearing, wherein:

the guide rod at least partially extends into the pressing block; and the spring abuts against the pressing block at an end of the spring.

3. The steering column connection mechanism according to claim 2, wherein:

each of the linear needle roller bearing and the guide rail is in a V shape, the linear needle roller bearing and the guide rail matching with each other and being attached to each other; and the pressing block comprises an arrow-shaped portion, the arrow-shaped portion extending into a V-shaped opening of the guide rail to press the guide rail tightly against the linear needle roller bearing.

4. The steering column connection mechanism according to claim 3, further comprising an adjustment bottom plate fixedly connected to the steering column, the adjustment bottom plate having a V-shaped connection portion configured to receive and be connected to the linear needle roller bearing.

5. The steering column connection mechanism according to claim 3, wherein an angle of each of a V-shaped opening of the linear needle roller bearing and the V-shaped opening of the guide rail is smaller than 90°.

6. The steering column connection mechanism according to claim 2, wherein the pressing block has a trapezoidal guide hole at a side of the pressing block away from the guide rail, both the guide rod and the spring at least partially extending into the trapezoidal guide hole.

7. The steering column connection mechanism according to claim 1, further comprising:

a support, the pre-tightening adjustment mechanism being disposed at the support; and a mounting bottom plate connected to the vehicle frame, the support being fixedly connected to the mounting bottom plate.

8. The steering column connection mechanism according to claim 7, wherein:

the support has a threaded hole, the nut and the threaded hole being connected to each other through a thread; and the nut is rotatable relative to the support to drive the guide rod to move relative to the support in such a manner that the pressure exerted by the spring on the sliding guide rail mechanism is adjusted.

9. The steering column connection mechanism according to claim 7, wherein:

the support has a recess; and the sliding guide rail mechanism comprises a pressing block, the pressing block having a connection portion formed at an end of the pressing block close to the support, and the connection portion being received in the recess.

10. A vehicle, comprising:

a vehicle body; and the steering column connection mechanism according to claim 1, the steering column connection mechanism being disposed at the vehicle body.

11. The vehicle according to claim 10, wherein the sliding guide rail mechanism comprises:

a linear needle roller bearing connected to the steering column;

a guide rail; and a pressing block connected to the vehicle frame, the pressing block abutting against the guide rail and pressing the guide rail tightly against the linear needle roller bearing, wherein:

the guide rod at least partially extends into the pressing block; and the spring abuts against the pressing block at an end of the spring.

12. The vehicle according to claim 11, wherein:

each of the linear needle roller bearing and the guide rail is in a V shape, the linear needle roller bearing and the guide rail matching with each other and being attached to each other; and the pressing block comprises an arrow-shaped portion, the arrow-shaped portion extending into a V-shaped opening of the guide rail to press the guide rail tightly against the linear needle roller bearing.

13. The vehicle according to claim 12, further comprising an adjustment bottom plate fixedly connected to the steering column, the adjustment bottom plate having a V-shaped connection portion configured to receive and be connected to the linear needle roller bearing.

14. The vehicle according to claim 12, wherein an angle of each of a V-shaped opening of the linear needle roller bearing and the V-shaped opening of the guide rail is smaller than 90°.

15. The vehicle according to claim 11, wherein the pressing block has a trapezoidal guide hole at a side of the pressing block away from the guide rail, both the guide rod and the spring at least partially extending into the trapezoidal guide hole.

16. The vehicle according to claim 10, further comprising:

a support, the pre-tightening adjustment mechanism being disposed at the support; and a mounting bottom plate connected to the vehicle frame, the support being fixedly connected to the mounting bottom plate.

17. The vehicle according to claim 16, wherein:

the support has a threaded hole, the nut and the threaded hole being connected to each other through a thread; and the nut is rotatable relative to the support to drive the guide rod to move relative to the support in such a manner that the pressure exerted by the spring on the sliding guide rail mechanism is adjusted.

18. The vehicle according to claim 16, wherein:

the support has a recess; and the sliding guide rail mechanism comprises a pressing block, the pressing block having a connection portion formed at an end of the pressing block close to the support, and the connection portion being received in the recess.

\* \* \* \* \*